(12) United States Patent
Lin et al.

(10) Patent No.: US 11,880,747 B2
(45) Date of Patent: Jan. 23, 2024

(54) IMAGE RECOGNITION METHOD, TRAINING SYSTEM FOR OBJECT RECOGNITION MODEL AND TRAINING METHOD FOR OBJECT RECOGNITION MODEL

(71) Applicant: INDUSTRIAL TECHNOLOGY RESEARCH INSTITUTE, Hsinchu (TW)

(72) Inventors: Hsin-Cheng Lin, Hemei Township (TW); Sen-Yih Chou, Hsinchu (TW)

(73) Assignee: INDUSTRIAL TECHNOLOGY RESEARCH INSTITUTE, Hsinchu (TW)

(*) Notice: Subject to any disclaimer, the term of this patent is extended or adjusted under 35 U.S.C. 154(b) by 366 days.

(21) Appl. No.: 16/728,285

(22) Filed: Dec. 27, 2019

(65) Prior Publication Data
US 2021/0150272 A1    May 20, 2021

(30) Foreign Application Priority Data
Nov. 15, 2019   (TW) .................... 108141560

(51) Int. Cl.
*G06N 20/00*    (2019.01)
*G06V 20/20*    (2022.01)
(Continued)

(52) U.S. Cl.
CPC ......... *G06N 20/00* (2019.01); *G06F 18/2148* (2023.01); *G06F 18/2415* (2023.01); *G06V 10/7715* (2022.01); *G06V 20/20* (2022.01)

(58) Field of Classification Search
CPC ......... G06V 10/7747; G06V 30/19147; G06V 10/764; G06V 30/19173; G06V 20/00; G06V 20/05; G06V 20/50; G06V 20/60; G06V 20/66; G06V 20/69; G06V 20/693; G06V 20/695; G06V 20/698; G06V 20/70; G06V 10/7715; G06V 30/19127; G06K 9/6257; G06K 9/6277; G06K 9/6232; G06N 20/00
See application file for complete search history.

(56) References Cited

U.S. PATENT DOCUMENTS

| | | |
|---|---|---|
| 8,140,456 B2 | 3/2012 | Hamamoto et al. |
| 9,031,317 B2 | 5/2015 | Yakubovich et al. |

(Continued)

FOREIGN PATENT DOCUMENTS

| | | |
|---|---|---|
| CN | 104268593 A | 1/2015 |
| CN | 107451661 A | 12/2017 |

(Continued)

OTHER PUBLICATIONS

Zhang, Zhi, et al. "Bag of freebies for training object detection neural networks." arXiv preprint arXiv:1902.04103 (2019). (Year: 2019).*

(Continued)

*Primary Examiner* — Amandeep Saini
*Assistant Examiner* — Denise G Alfonso
(74) *Attorney, Agent, or Firm* — Birch, Stewart, Kolasch & Birch, LLP

(57) ABSTRACT

An image recognition method, a training system for an object recognition model and a training method for an object recognition model are provided. The image recognition method includes the following steps. At least one original sample image of an object in a field and an object range information and an object type information in the original sample image are obtained. At least one physical parameter is adjusted to generate plural simulated sample images of the object. The object range information and the object type information of the object in each of the simulated sample images are automatically marked. A machine learning procedure is performed to train an object recognition model. An image recognition procedure is performed on an input image.

15 Claims, 16 Drawing Sheets

(51) Int. Cl.
*G06F 18/214* (2023.01)
*G06F 18/2415* (2023.01)
*G06V 10/77* (2022.01)

(56) References Cited

U.S. PATENT DOCUMENTS

2014/0079314 A1* 3/2014 Yakubovich ............ G06T 15/20
382/155
2018/0189607 A1* 7/2018 Cocias ................. G06V 20/582
2019/0251434 A1 8/2019 Wu et al.

FOREIGN PATENT DOCUMENTS

| CN | 109002686 A | 12/2018 |
| CN | 109063845 A | 12/2018 |
| CN | 109344904 A | 2/2019 |
| TW | I592810 B | 7/2017 |
| TW | M576314 U | 4/2019 |

OTHER PUBLICATIONS

Barth, Ruud, et al. "Data synthesis methods for semantic segmentation in agriculture: A Capsicum annuum dataset." Computers and electronics in agriculture 144 (2018): 284-296. (Year: 2018).*
DeVries, Terrance, and Graham W. Taylor. "Improved regularization of convolutional neural networks with cutout." arXiv preprint arXiv:1708.04552 (2017). (Year: 2017).*
Wei, Yunchao, et al. "Object region mining with adversarial erasing: A simple classification to semantic segmentation approach." Proceedings of the IEEE conference on computer vision and pattern recognition. 2017. (Year: 2017).*
Taiwanese Office Action and Search Report for Taiwanese Application No. 108141560, dated May 18, 2020.
Zhang et al., "Bag of Freebies for Training Object Detection Neural Networks", arXiv:1902.04103v3 [cs.CV], Apr. 12, 2019, pp. 1-8.

* cited by examiner

IMAGE RECOGNITION METHOD, TRAINING SYSTEM FOR OBJECT RECOGNITION MODEL AND TRAINING METHOD FOR OBJECT RECOGNITION MODEL

This application claims the benefit of Taiwan application Serial No. 108141560, filed Nov. 15, 2019, the disclosure of which is incorporated by reference herein in its entirety.

TECHNICAL FIELD

The disclosure relates in general to an image recognition method, a training system for an object recognition model and a training method for an object recognition model.

BACKGROUND

Along with the development in the artificial intelligence (AI) technology, the demand for image recognition keeps increasing. Generally speaking, to increase the recognition accuracy of an image recognition model, the image recognition model requires a large volume of images for the learning purpose.

If the category to be recognized is rough, such as mobile phones, computers, and computer mice, it is relatively easy to obtain a large volume of images for learning purpose with respect to each category.

If the category to be recognized is more specific, for example, the model of a computer mouse such as model A, model B, or model C, it is not easy to obtain a large volume of images for learning purpose with respect to each category, and recognition accuracy will be severely affected.

In the field of auto piloting, the street views are at the control of a few companies, and the acquisition of street views becomes very difficult. In the application fields such as automatic optical inspection (AOI) and smart retail stores where product variability is high and fast, it is also difficult to obtain a large volume of images for each category of each field.

Therefore, it has become a prominent task for the industry to perform a machine learning procedure to train an image recognition model under the circumstance when only a small volume of original images is available.

SUMMARY

The present disclosure relates to an image recognition method, a training system for an object recognition model and a training method for an object recognition model.

According to one embodiment of the present disclosure, an image recognition method is provided. The image recognition method includes the following steps. At least one original sample image of an object in a field and an object range information and an object type information of the object are obtained. At least one physical parameter is adjusted to generate a plurality of simulated sample images of the object. The object range information and the object type information of each of the simulated sample images are automatically marked. A machine learning procedure is performed to train an object recognition model. An image recognition procedure is performed on an input image according to the object recognition model to identify whether the input image has the object and the object range information and object type information of the object in the input image.

According to another embodiment of the present disclosure, a training system for an object recognition model is provided. The training system a storage device, a sample generation device and a machine learning device. The storage device is configured to store at least one original sample image of an object shot by an image capture device in a field and an object range information and an object type information of the object in the original sample image. The sample generation device includes a parameter adjusting unit and a marking unit. The parameter adjusting unit is configured to adjust at least one physical parameter to generate a plurality of simulated sample images of the object. The marking unit is configured to automatically mark the object range information and the object type information of the object in each of the simulated sample images. The machine learning device performs a machine learning procedure according to the original sample image, the simulated sample images, the object range information and the object type information to train an object recognition model. An image recognition procedure is performed on an input image according to the object recognition model to identify whether the input image has the object and the object range information and the object type information of the object in the input image.

According to an alternate embodiment of the present disclosure, a training method for an object recognition model is provided. The image recognition method includes the following steps. At least one original sample image of an object in a field and an object range information and an object type information of the object in the original sample image are obtained. At least one physical parameter is adjusted to generate a plurality of simulated sample images of the object. The object range information and the object type information of the object in each of the simulated sample images are automatically marked. A machine learning procedure is performed according to the original sample image, the simulated sample images, the object range information and the object type information to train an object recognition model, wherein an image recognition procedure is performed on an input image according to the object recognition model to identify whether the input image has the object and the object range information and the object type information of the object in the input image.

The above and other aspects of the disclosure will become better understood with regards to the following detailed description of the preferred but non-limiting embodiment(s). The following description is made with reference to the accompanying drawings.

Figure 1:
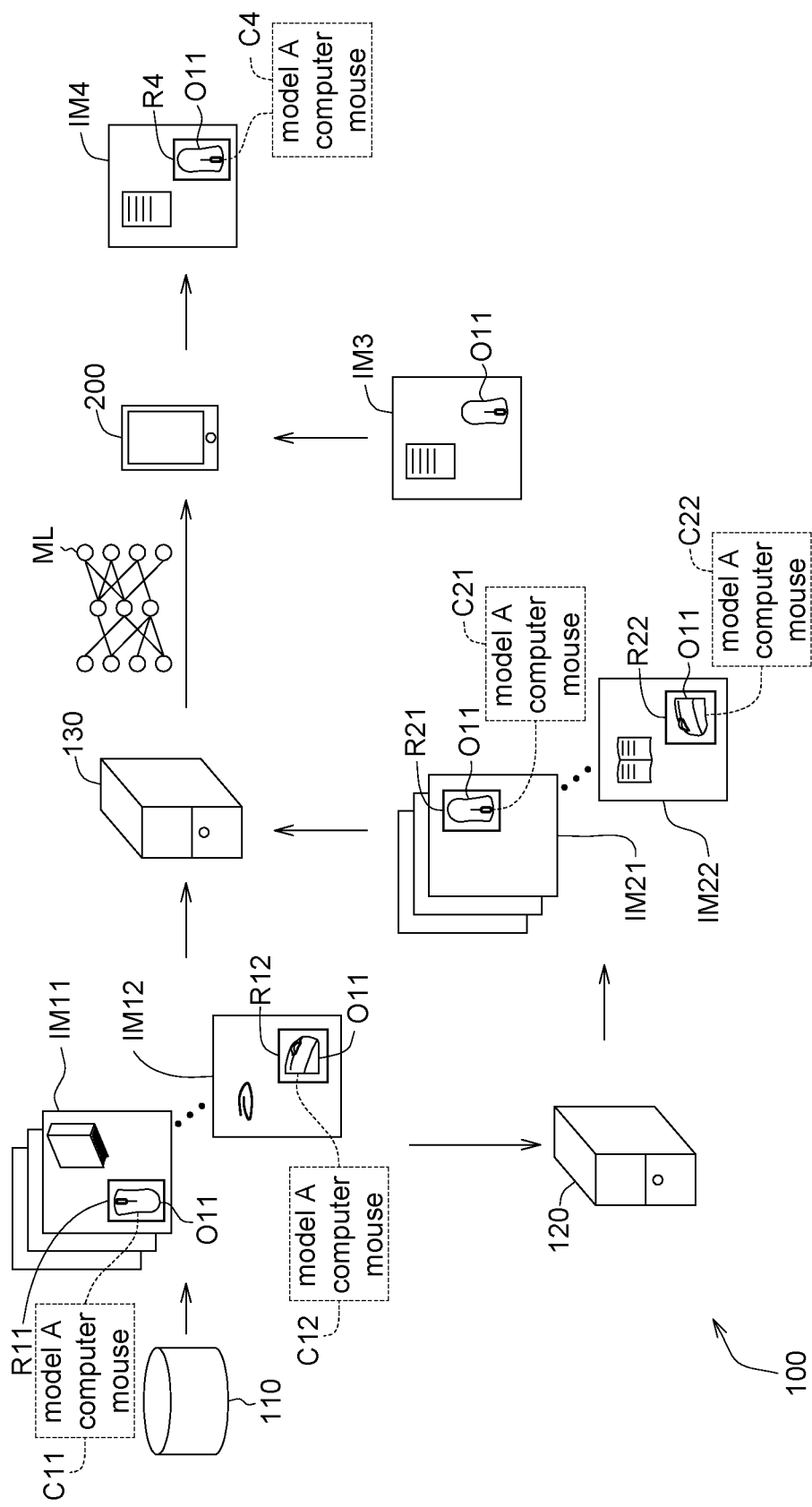
FIG. 1 is a schematic diagram of a training system and a mobile device according to an embodiment.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

DETAILED DESCRIPTION

Referring to FIG. 1, a schematic diagram of a training system 100 and a mobile device 200 according to an embodiment is shown. The training system 100 includes a storage device 110, a sample generation device 120 and a machine learning device 130. The storage device 110 is such as a memory, a memory card, a hard drive, or a cloud storage center. The sample generation device 120 and the machine learning device 130 may be realized by such as a computer, a server, a circuit board, a circuit, a chip, several programming codes or a storage device storing the programming codes. The storage device 110 is configured to store at least one original sample image (such as an original sample image IM11 and an original sample image IM12) of an object O11 in a field.

The sample generation device 120 generates a plurality of simulated sample images of the object O11 according to the original sample image (such as generates a simulated sample image IM21 of the object O11 according to the original sample image IM11 and generates a simulated sample image IM22 of the object O11 according to the original sample image IM12).

The machine learning device 130 performs a machine learning procedure according to the original sample images IM11, IM12 etc. and the simulated sample images IM21, IM22, etc. to train an object recognition model ML.

After the mobile device 200 is installed with the object recognition model ML, the mobile device 200 may perform an image recognition procedure on an input image IM3 to identify whether the input image IM3 has the object O11. The application fields of the image recognition method, the training system 100 for the object recognition model ML and the training method for the object recognition model ML of the present disclosure are not limited to mobile device, and may also be used in other devices such as computer or embedded system.

The training system 100 of the present embodiment may generate the simulated sample images IM21, IM22, etc., to make up the deficiency of the original sample images IM11, IM12, etc. Thus, the training system 100 of the present embodiment may perform image recognition by using the artificial intelligence technology even when only a small volume of original images is available. The operations of the above elements are disclosed below with a block diagram and a flowchart.

Figure 2:
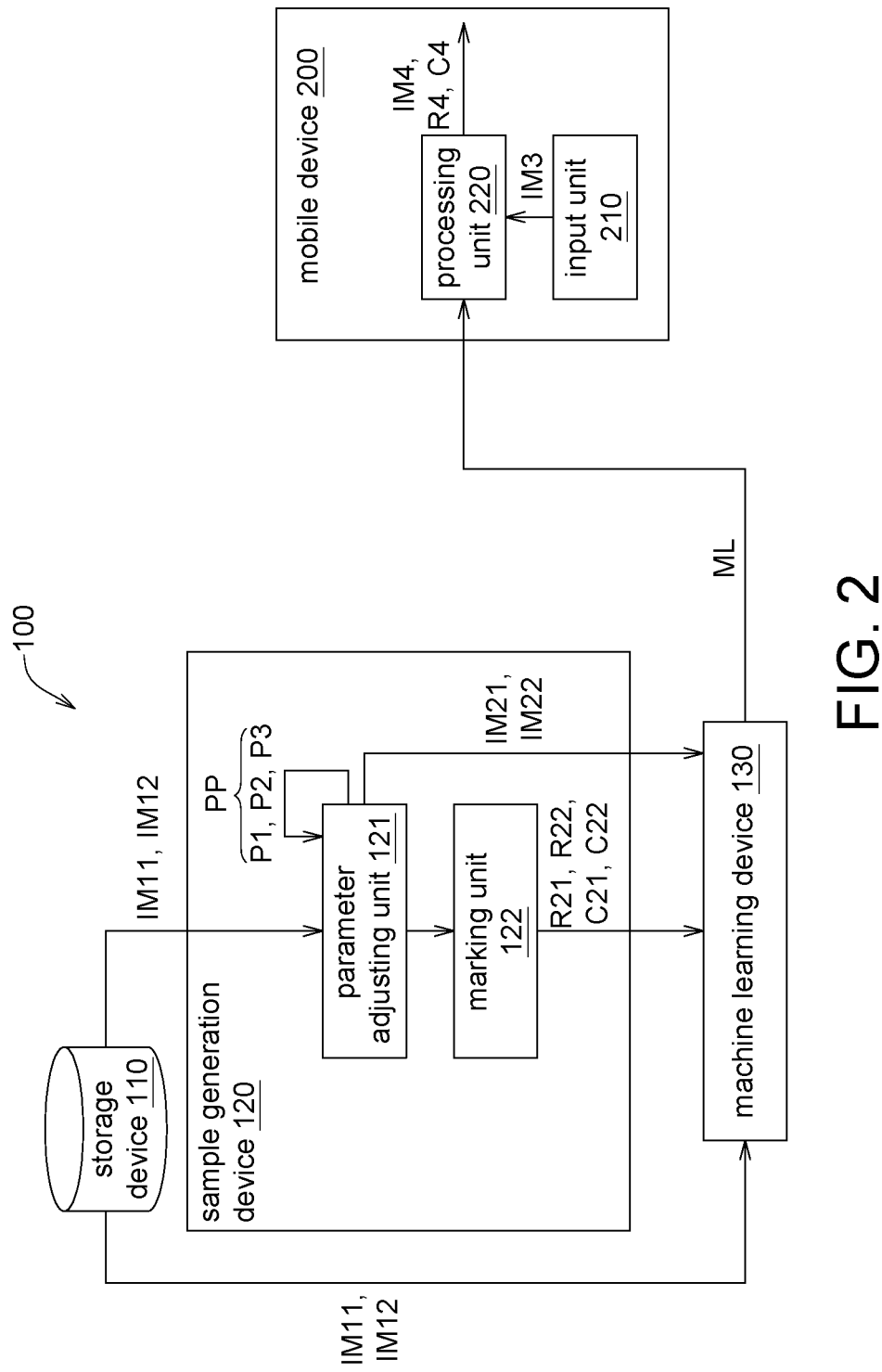
FIG. 2 is a block diagram of the training system and the mobile device according to an embodiment.
Figure 3:
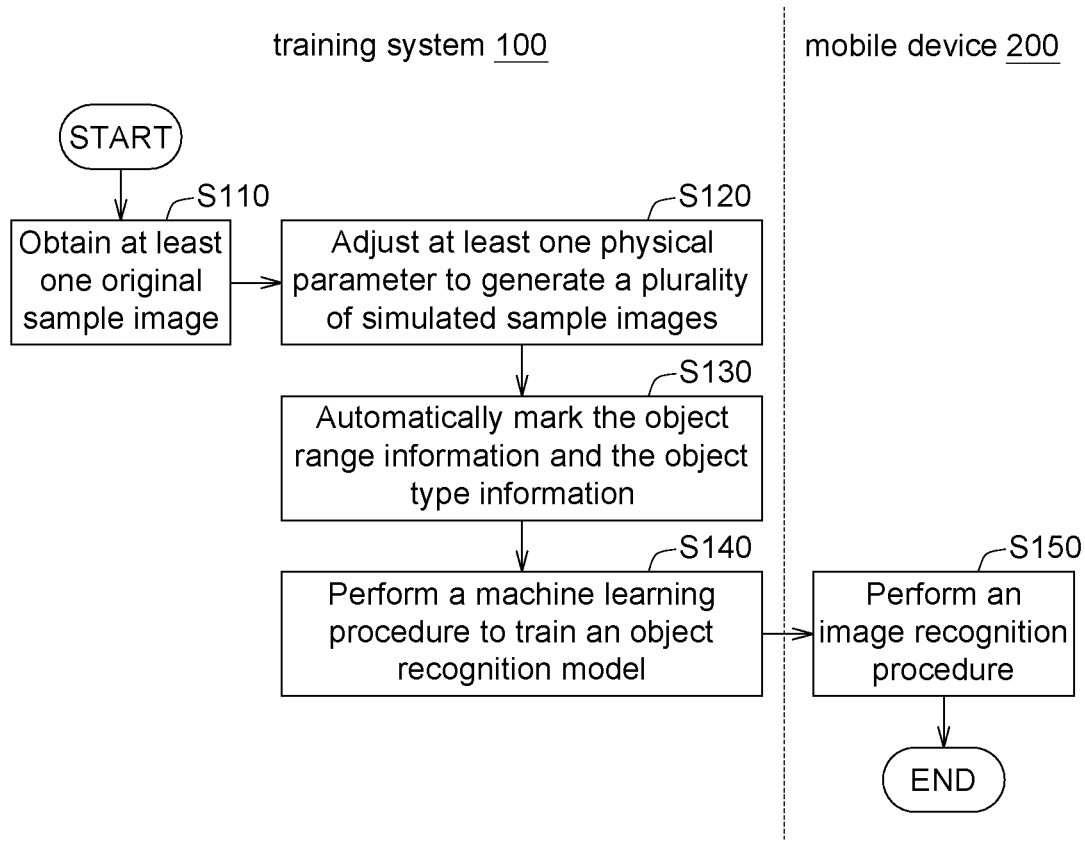
FIG. 3 is a flowchart of an image recognition method according to an embodiment.

Refer to FIGS. 2 to 3. FIG. 2 is a block diagram of the training system 100 and the mobile device 200 according to an embodiment. FIG. 3 is a flowchart of an image recognition method according to an embodiment. As indicated in FIG. 2, the training system 100 includes the storage device 110, the sample generation device 120 and the machine learning device 130 as disclosed above. The sample generation device 120 includes a parameter adjusting unit 121 and a marking unit 122. The parameter adjusting unit 121 and the marking unit 122 may be realized by such as a chip, a circuit, a circuit board, several programming codes or a storage device storing the programming codes. The mobile device 200 includes an input unit 210 and a processing unit 220. The input unit 210 may be realized by such as a wireless receiving module, a connection port, a memory card slot, a camera, or a video recorder. The processing unit 220 may be realized by such as a chip, a circuit, a circuit board, several programming codes or a storage device storing the programming codes.

As indicated in the step S110 of FIG. 3, at least one original sample image IM11, IM12, etc. of an object O11 in a field is obtained by the storage device 110, wherein the object O11 is such as a product in an automatic vending cabinet. In the present step, the original sample images IM11, IM12, etc. may be images of the object O11 shot by a camera from different shooting angles. During the shooting procedure, the camera may revolve around the object O11 or the object O11 may rotate by itself. The original sample images IM11, IM12, etc. with different faces may be obtained from different shooting angles. Based on the original sample images IM11, IM12, etc., more simulated sample images IM21, IM22, etc. may be generated in the following step.

As indicated in the step S120 of FIG. 3, at least one physical parameter PP is adjusted by the parameter adjusting unit 121 to generate a plurality of simulated sample images IM21, IM22, etc. of the object O11, wherein the physical parameter PP is such as an image capture parameter P1, an object parameter P2, or an ambient parameter P3. The image capture parameter P1 is such as a relative position between an image capture device and the object O11, a relative distance between the image capture device and the object O11, a lens distortion of the image capture device, a contrast of the image capture device, or a volume of exposure of the image capture device. The object parameter P2 is such as an object rotation angle, an object displacement, an object covering ratio, or an object shade. The ambient parameter P3 is such as a background color, a scene, an ambient brightness, or a light source position.

The parameter adjusting unit 121 may simultaneously adjust the image capture parameter P1, the object parameter P2, and the ambient parameter P3. Or, the parameter adjusting unit 121 may merely adjust the image capture parameter P1 and the object parameter P2, merely adjust the image capture parameter P1 and the ambient parameter P3, merely adjust the object parameter P2 and the ambient parameter P3, merely adjust the image capture parameter P1, merely adjust the object parameter P2, or merely adjust the ambient parameter P3. The adjusting of the physical parameter PP is exemplified below with a detailed flowchart and an exemplary diagram.

Figure 4:
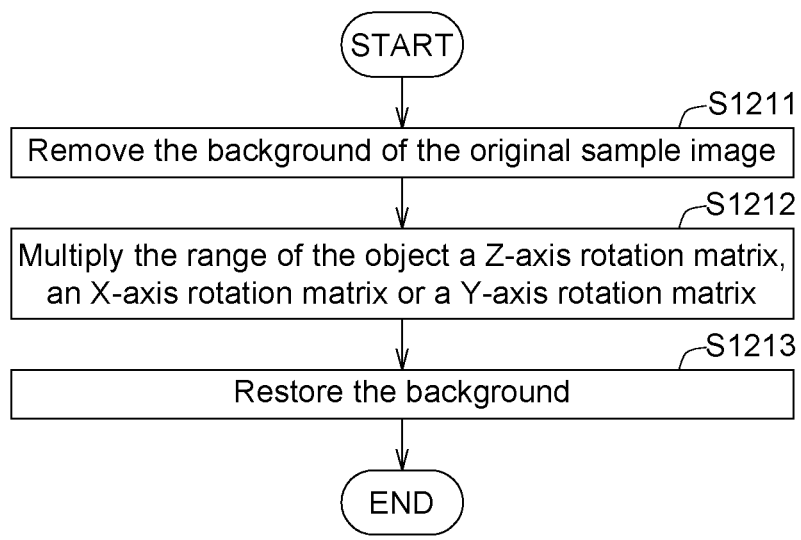
FIG. 4 is a detailed flowchart of adjusting an object rotation angle according to an embodiment.
Figure 5A:
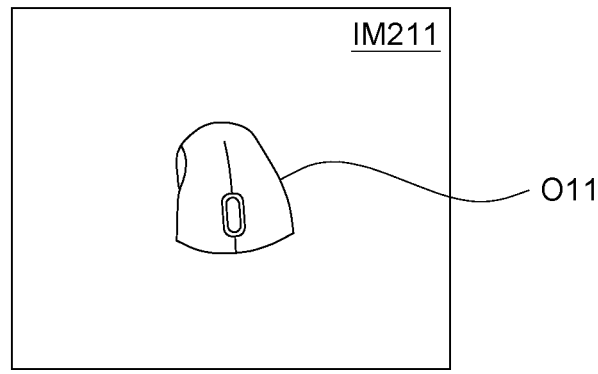
FIGS. 5A to 5C are schematic diagrams of the adjusting result of FIG. 4.
Figure 5B:
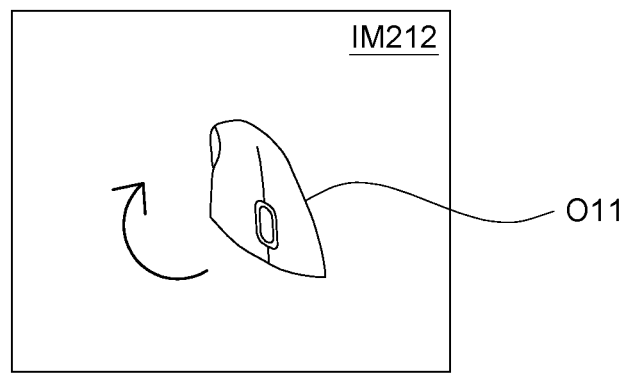
Figure 5C:
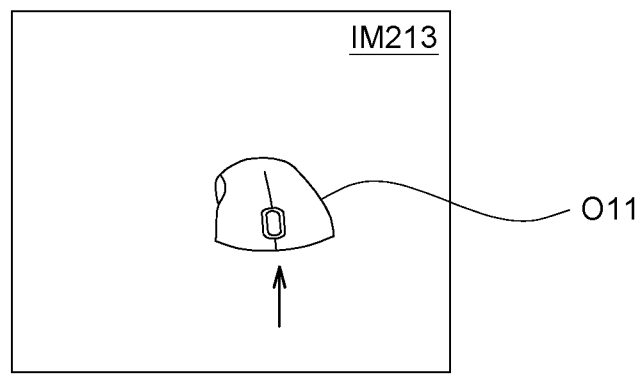

Refer to FIG. 4 and FIGS. 5A to 5C. FIG. 4 is a detailed flowchart of adjusting an object rotation angle according to an embodiment. FIGS. 5A to 5C are schematic diagrams of the adjusting result of FIG. 4. FIGS. 5A to 5C illustrate how the simulated sample images IM211, IM212, and IM213 of the object O11 are generated according to the original sample image IM11.

In step S1211, the background of the original sample image IM11 is removed by the parameter adjusting unit 121.

Then, the method proceeds to step S1212, the range of the object O11 is multiplied by a Z-axis rotation matrix, an X-axis rotation matrix or a Y-axis rotation matrix by the parameter adjusting unit 121. The Z-axis rotation matrix may be expressed as formula (1), the X-axis rotation matrix may be expressed as formula (2), and the Y-axis rotation matrix may be expressed as formula (3).

$$R_Z = \begin{bmatrix} \cos\theta_Z & \sin\theta_Z & 0 & 0 \\ -\sin\theta_Z & \cos\theta_Z & 0 & 0 \\ 0 & 0 & 1 & 0 \\ 0 & 0 & 0 & 1 \end{bmatrix} \quad (1)$$

$$R_X = \begin{bmatrix} 1 & 0 & 0 & 0 \\ 0 & \cos\theta_X & \sin\theta_X & 0 \\ 0 & -\sin\theta_X & \cos\theta_X & 0 \\ 0 & 0 & 0 & 1 \end{bmatrix} \quad (2)$$

$$R_Y = \begin{bmatrix} \cos\theta_Y & 0 & -\sin\theta_Y & 0 \\ 0 & 1 & 0 & 0 \\ \sin\theta_Y & 0 & \cos\theta_Y & 0 \\ 0 & 0 & 0 & 1 \end{bmatrix} \quad (3)$$

Wherein, $R_Z$ represents a Z-axis rotation matrix, and $\theta_Z$ represents a Z-axis rotation angle obtained from a random number; $R_X$ represents an X-axis rotation matrix, and $\theta_X$ represents an X-axis rotation angle obtained from a random number; $R_Y$ represents a Y-axis rotation matrix, and $\theta_Y$ represents a Y-axis rotation angle obtained from a random number.

Then, the method proceeds to step S1213, the background is restored by the parameter adjusting unit 121. In the present step, the original background may be restored by the parameter adjusting unit 121 or may add in different backgrounds. Thus, different simulated sample images IM211, IM212, and IM213 may be created. As indicated in FIGS. 5A to 5C, the object O11 in the simulated sample images IM211, IM212, and IM213 is rotated by different angles.

Figure 6:
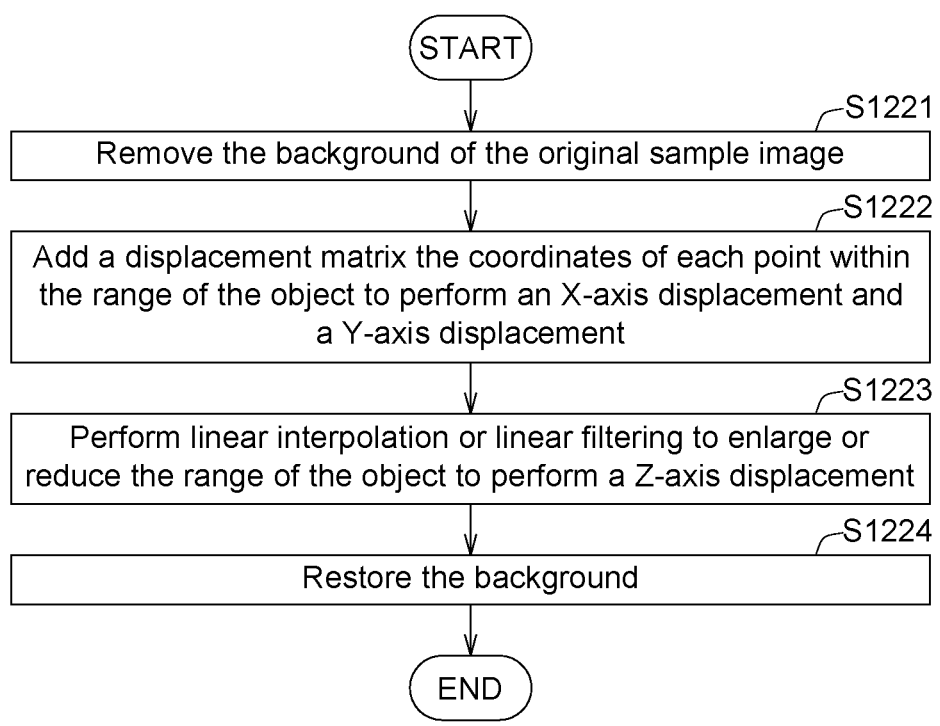
FIG. 6 is a detailed flowchart of adjusting an object displacement according to an embodiment.
Figure 7A:
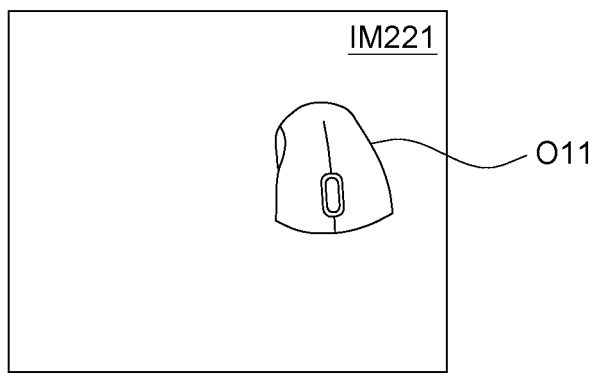
FIGS. 7A to 7C are schematic diagrams of the adjusting result of FIG. 6.
Figure 7B:
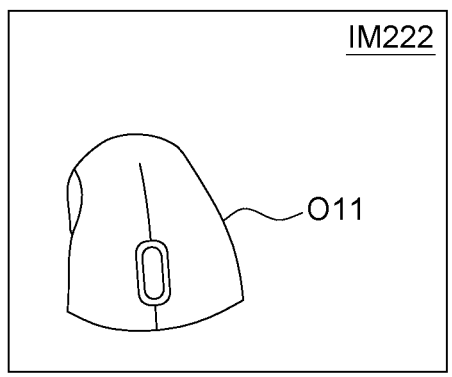
Figure 7C:
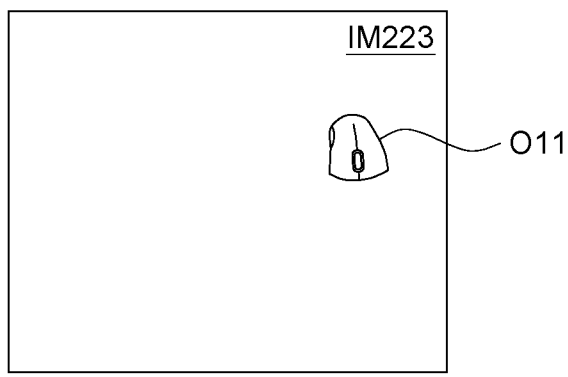

Refer to FIG. 6 and FIGS. 7A to 7C. FIG. 6 is a detailed flowchart of adjusting an object displacement according to an embodiment. FIGS. 7A to 7C are schematic diagrams of the adjusting result of FIG. 6. FIGS. 7A to 7C illustrate how the simulated sample images IM221, IM222, and IM223 of the object O11 are generated according to the original sample image IM11.

In step S1221, the background of the original sample image IM11 is removed by the parameter adjusting unit 121.

Then, the method proceeds to step S1222, a displacement matrix is added to the coordinates of each point within the range of the object O11 by the parameter adjusting unit 121 to perform an X-axis displacement and a Y-axis displacement. The displacement matrix may be expressed as formula (4).

$$S_{(x,y)} = \begin{bmatrix} (\Delta X, \Delta Y) & (\Delta X, \Delta Y) & (\Delta X, \Delta Y) & (\Delta X, \Delta Y) \\ (\Delta X, \Delta Y) & (\Delta X, \Delta Y) & (\Delta X, \Delta Y) & (\Delta X, \Delta Y) \\ (\Delta X, \Delta Y) & (\Delta X, \Delta Y) & (\Delta X, \Delta Y) & (\Delta X, \Delta Y) \\ (\Delta X, \Delta Y) & (\Delta X, \Delta Y) & (\Delta X, \Delta Y) & (\Delta X, \Delta Y) \end{bmatrix} \quad (4)$$

Wherein, $S_{(x,y)}$ represents a displacement matrix, $\Delta X$ represents an X-axis displacement obtained from a random number, and $\Delta Y$ represents a Y-axis displacement obtained from a random number.

Then, the method proceeds to step S1223, linear interpolation or linear filtering is performed by the parameter adjusting unit 121 to enlarge or reduce the range of the object O11 to perform a Z-axis displacement.

Then, the method proceeds to step S1224, the background is restored by the parameter adjusting unit 121. In the present step, the original background may be restored by the parameter adjusting unit 121 or add in different backgrounds. Thus, different simulated sample images IM221, IM222, and IM223 are created. As indicated in FIGS. 7A to 7C, the object O11 in the simulated sample images IM221, IM222, and IM223 is displaced to different positions.

Figure 8:
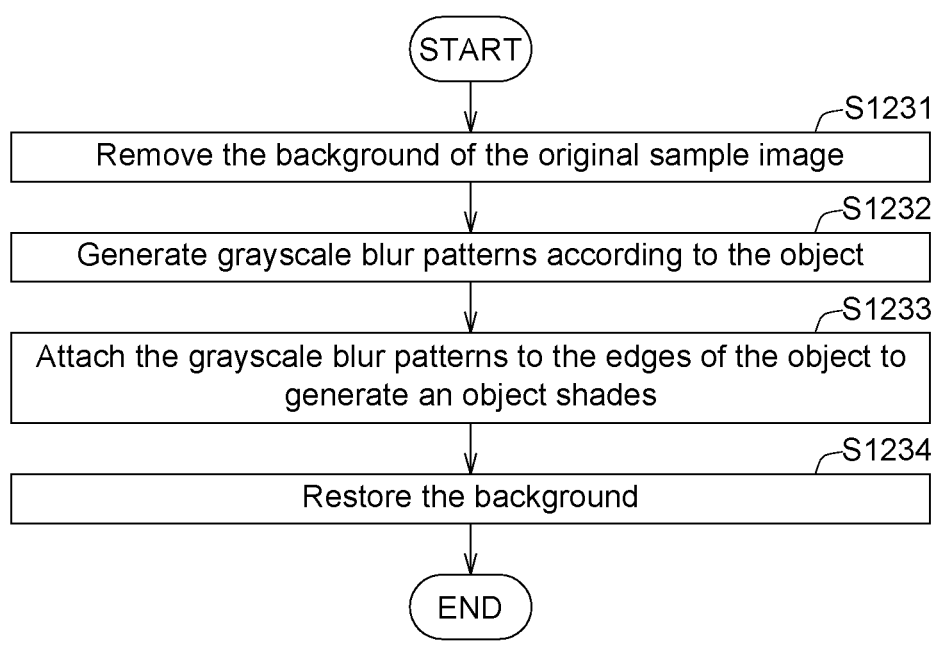
FIG. 8 is a detailed flowchart of adding an object shade according to an embodiment.
Figure 9A:
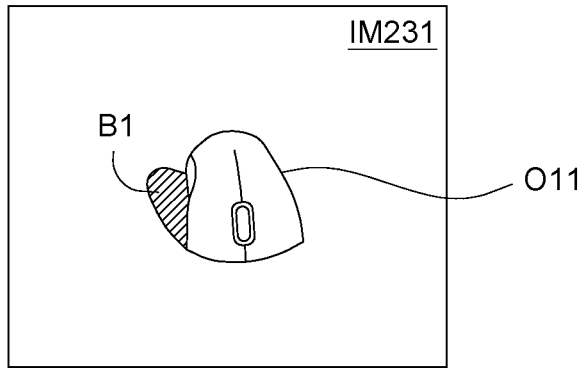
FIGS. 9A to 9C are schematic diagrams of the adjusting result of FIG. 8.
Figure 9B:
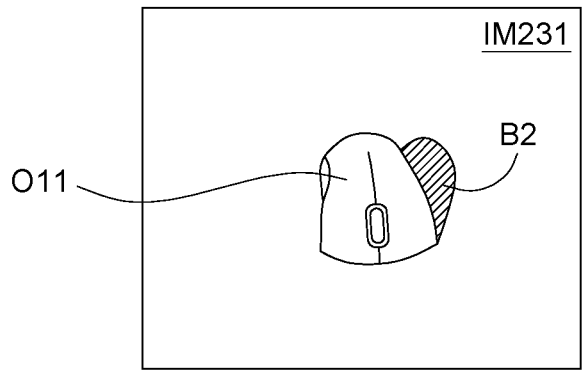
Figure 9C:
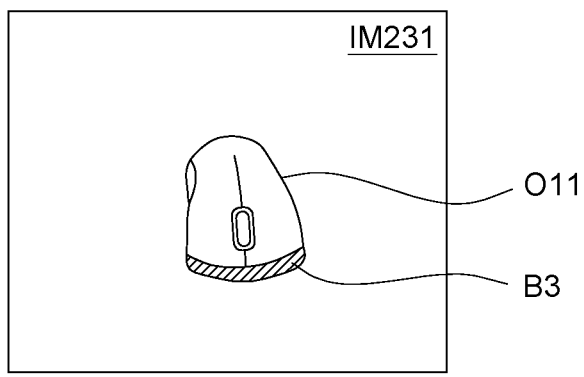

Refer to FIG. 8 and FIGS. 9A to 9C. FIG. 8 is a detailed flowchart of adding an object shade according to an embodiment. FIGS. 9A to 9C are schematic diagrams of the adjusting result of FIG. 8. FIGS. 9A to 9C illustrate how the simulated sample images IM231, IM232, IM233 of the object O11 are generated according to the original sample image IM11.

In step S1231, the background of the original sample image IM11 is removed by the parameter adjusting unit 121.

Then, the method proceeds to step S1232, grayscale blur patterns B1, B2, and B3 are generated by the parameter adjusting unit 121 according to the object O11.

Then, the method proceeds to step S1233, the grayscale blur patterns B1, B2, and B3 are attached to the edges of the object O11 by the parameter adjusting unit 121 to generate object shades.

Then, the method proceeds to step S1224, the original background may be restored by the parameter adjusting unit 121. In the present step, the original background may be restored by the parameter adjusting unit 121 or add in different backgrounds. Thus, different simulated sample images IM231, IM232, IM233 are created. As indicated in FIGS. 9A to 9C, the object O11 in the simulated sample images IM231, IM232, IM233 forms shades in different directions.

Figure 10:
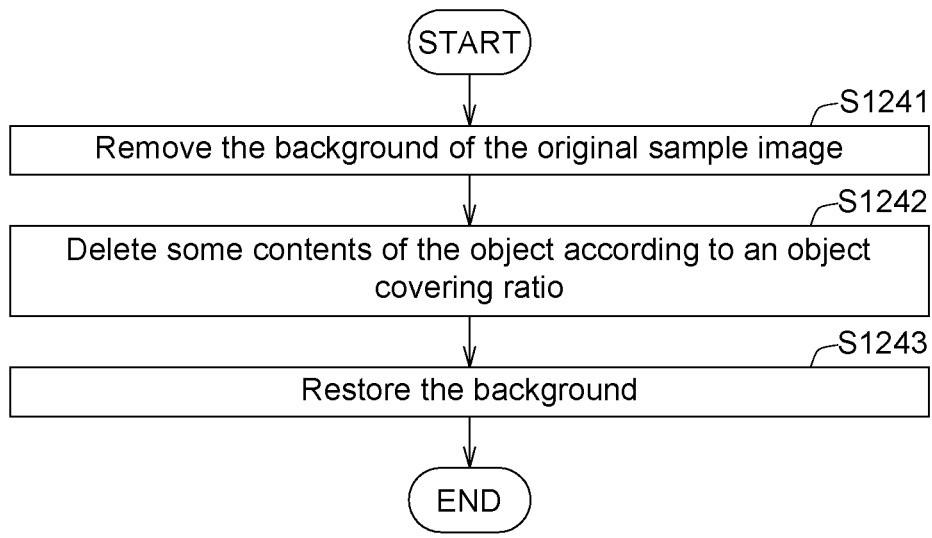
FIG. 10 is a detailed flowchart of setting an object covering ratio according to an embodiment.
Figure 11A:
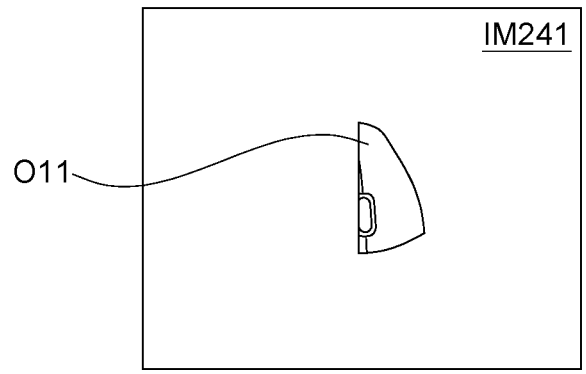
FIGS. 11A to 11C are schematic diagrams of the adjusting result of FIG. 10.
Figure 11B:
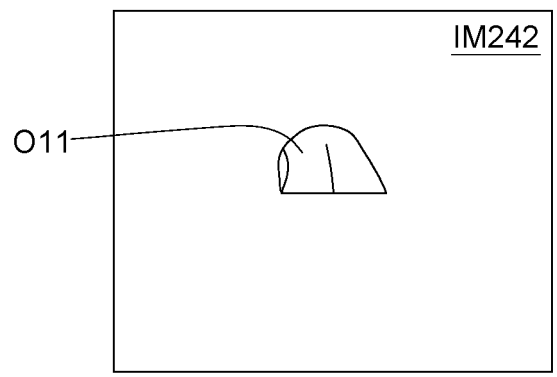
Figure 11C:
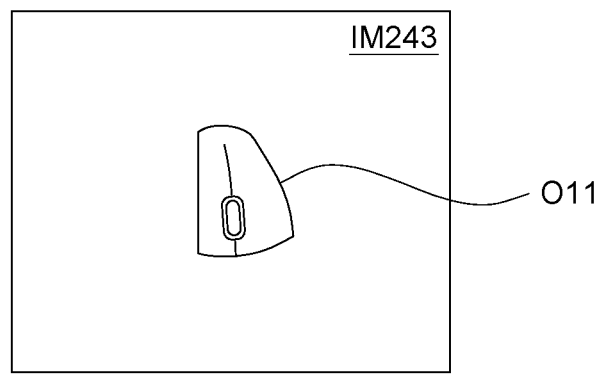

Refer to FIG. 10 and FIGS. 11A to 11C. FIG. 10 is a detailed flowchart of setting an object covering ratio according to an embodiment. FIGS. 11A to 11C are schematic diagrams of the adjusting result of FIG. 10. FIGS. 11A to 11C illustrate how the simulated sample images IM241, IM242, and IM243 of the object O11 are generated according to the original sample image IM11.

In step S1241, the background of the original sample image IM11 is removed by the parameter adjusting unit 121.

Then, the method proceeds to step S1242, some contents of the object O11 are deleted by the parameter adjusting unit 121 according to an object covering ratio, which is selected at random.

Then, the method proceeds to step S1243, the original background may be restored by the parameter adjusting unit 121. In the present step, the original background may be restored by the parameter adjusting unit 121 or add in different backgrounds. In the present step, the deleted contents may be interpolated or left un-interpolated. Thus, different simulated sample images IM241, IM242, and IM243 are created. As indicated in FIGS. 11A to 11C, the object O11 in the simulated sample images IM241, IM242, and IM243 has different object covering ratios.

Figure 12:
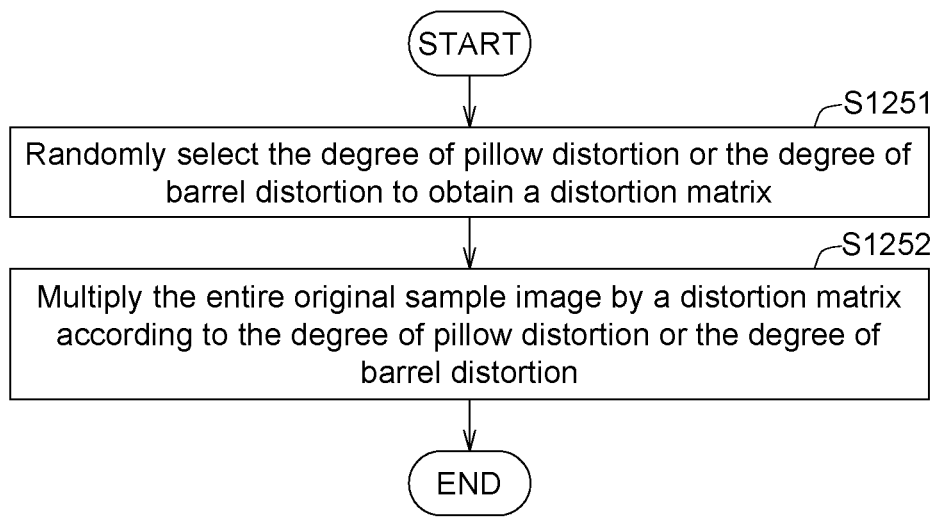
FIG. 12 is a detailed flowchart of setting a lens distortion according to an embodiment.
Figure 13A:
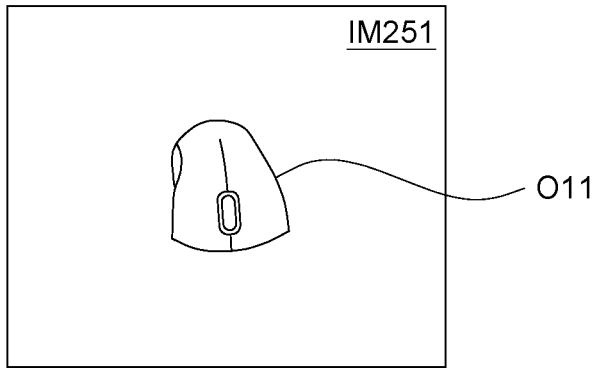
FIGS. 13A to 13C are schematic diagrams of the adjusting result of FIG. 12.
Figure 13B:
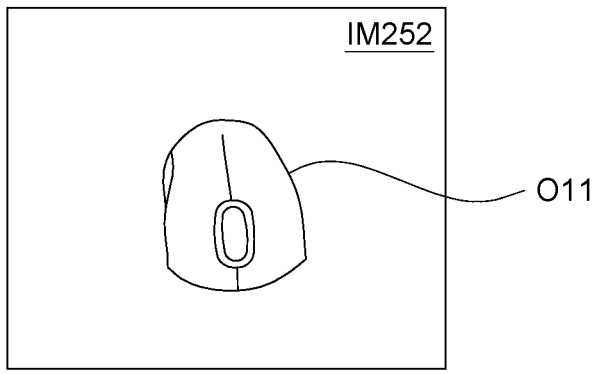
Figure 13C:
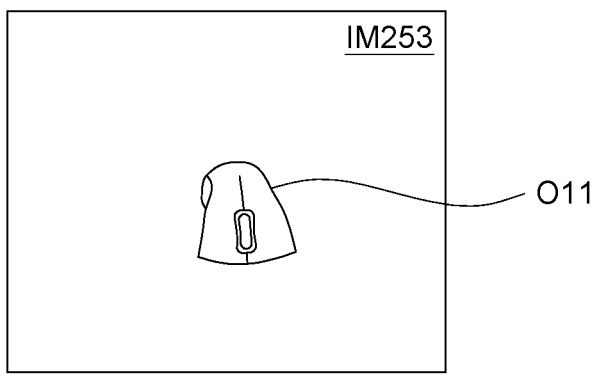

Refer to FIG. 12 and FIGS. 13A to 13C. FIG. 12 is a detailed flowchart of setting a lens distortion according to an embodiment. FIGS. 13A to 13C are schematic diagrams of the adjusting result of FIG. 12. FIGS. 13A to 13C illustrate how the simulated sample images IM251, IM252, and IM253 of the object O11 are generated according to the original sample image IM11.

In step S1251, the degree of pillow distortion or the degree of barrel distortion is randomly selected by the parameter adjusting unit 121 to obtain a distortion matrix.

Then, the method proceeds to step S1252, the entire original sample image IM11 is multiplied by a distortion matrix by the parameter adjusting unit 121 according to the degree of pillow distortion or the degree of barrel distortion. Thus, different simulated sample images IM251, IM252, and IM253 are created. As indicated in FIGS. 13A to 13C, the object O11 in the simulated sample images IM251, IM252, and IM253 has different degrees of lens distortion.

Figure 14:
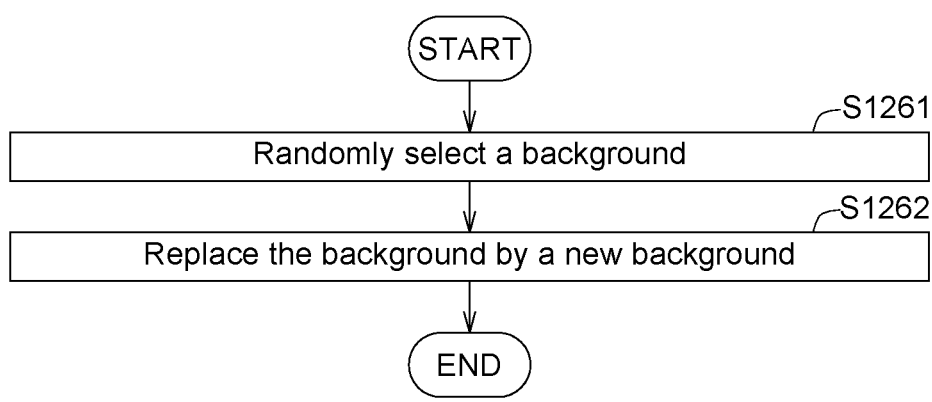
FIG. 14 is a detailed flowchart of changing a scene according to an embodiment.
Figure 15A:
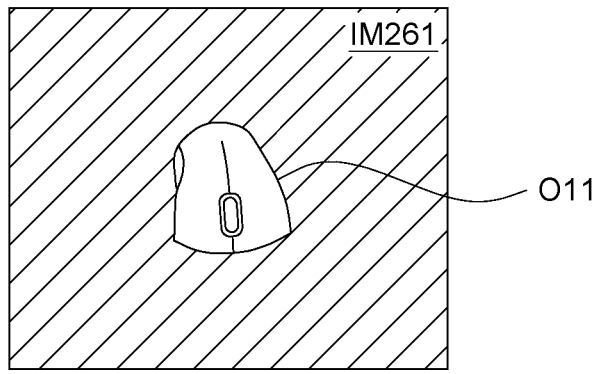
FIGS. 15A to 15C are schematic diagrams of the adjusting result of FIG. 14.
Figure 15B:
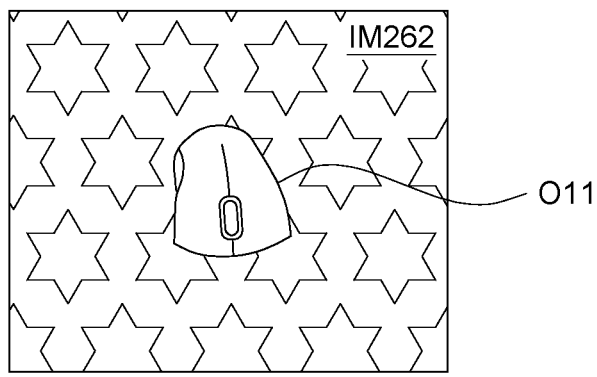
Figure 15C:
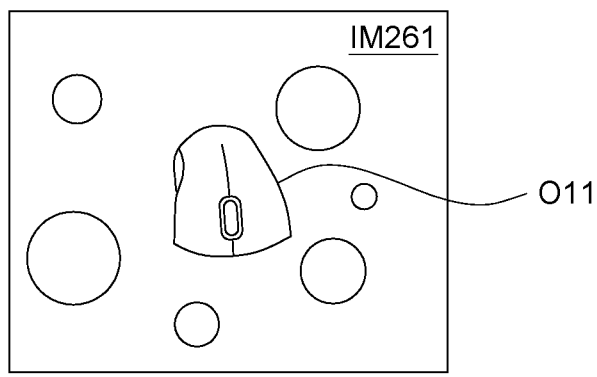

Refer to FIG. 14 and FIGS. 15A to 15C. FIG. 14 is a detailed flowchart of changing a scene according to an embodiment. FIGS. 15A to 15C are schematic diagrams of the adjusting result of FIG. 14. FIGS. 15A to 15C illustrate how the simulated sample images IM261, IM262, and IM263 of the object O11 are generated according to the original sample image IM11.

In step S1261, the background is randomly selected by the parameter adjusting unit 121.

Then, the method proceeds to step S1262, the background is replaced by a new background, the parameter adjusting unit 121. Thus, different simulated sample images IM261, IM262, and IM263 are created. As indicated in FIGS. 15A to 15C the object O11 of the simulated sample images IM261, IM262, and IM263 has different scenes.

Figure 16:
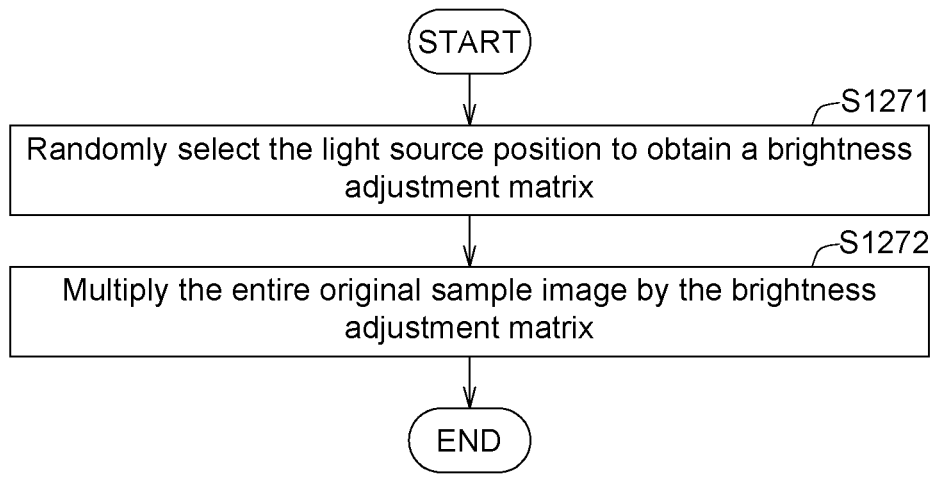
FIG. 16 is a detailed flowchart of changing a light source position according to an embodiment.
Figure 17A:
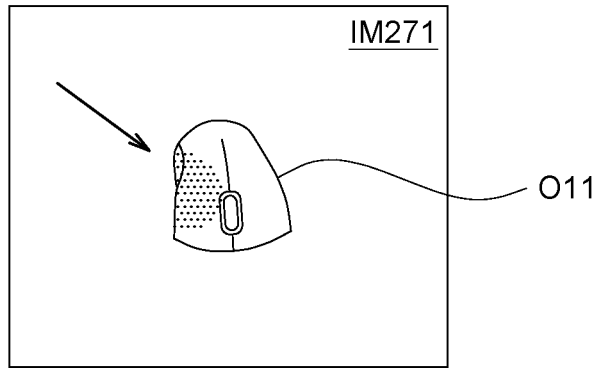
FIGS. 17A to 17C are schematic diagrams of the adjusting result of FIG. 16.
Figure 17B:
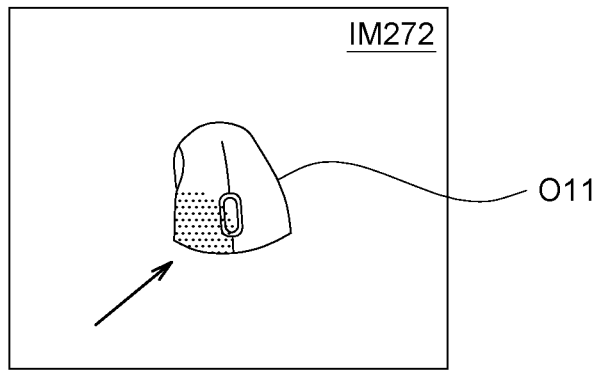
Figure 17C:
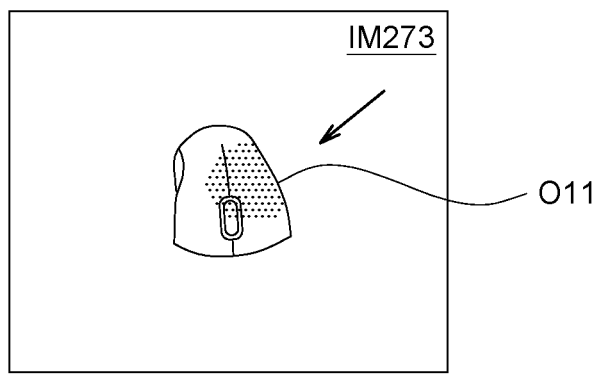

Refer to FIG. 16 and FIGS. 17A to 17C. FIG. 16 is a detailed flowchart of changing a light source position according to an embodiment. FIGS. 17A to 17C are schematic diagrams of the adjusting result of FIG. 16. FIGS. 17A to 17C illustrate how the simulated sample images IM271, IM272, IM273 of the object O11 are generated according to the original sample image IM11.

In step S1271, the light source position is randomly selected by the parameter adjusting unit 121 to obtain a brightness adjustment matrix, wherein the brightness adjustment matrix is formed by radiating the brightest spot outwards with the brightness being progressively decreased.

Then, the method proceeds to step S1272, the entire original sample image IM11 is multiplied by the brightness adjustment matrix by the parameter adjusting unit 121. Thus, different simulated sample images IM271, IM272, IM273 are created. As indicated in FIGS. 17A to 17C, the object O11 in the simulated sample images IM271, IM272, IM273 has different light source position.

In an embodiment, suppose the parameter adjusting unit 121 simultaneously adjusts the image capture parameter P1 and the object parameter P2. Since the adjustment of the object parameter P2 needs to remove the background and then restore it, an adjustment of the object parameter P2 has priority over the adjustment of the image capture parameter P1.

In an embodiment, suppose the parameter adjusting unit 121 simultaneously adjusts the object parameter P2 and the ambient parameter P3. Since the adjustment of the object parameter P2 needs to remove the background and then restore it, the adjustment of the object parameter P2 has priority over the adjustment of the ambient parameter P3.

The adjustment process of the physical parameter PP of the step S120 of FIG. 3 may be completed according to the above descriptions of FIG. 4 to FIG. 17C.

Then, the method proceeds to step S130 of FIG. 3, as indicated in FIG. 1, the object range information R11, R12, etc. and the object type information C11, C12, etc. of the object O11 in each of the simulated sample images IM21, IM22, etc. are automatically marked by the marking unit 122. For example, in FIG. 1, the object range information R11, R12, etc. and the object type information C11, C12, etc. of the original sample images IM11, IM12, etc. are known. Since the simulated sample images IM21, IM22, etc. are generated by the parameter adjusting unit 121 according to the original sample image IM11, IM12, etc., the marking unit 122 may obtain the object range information R21, R22, etc. and the object type information C21, C22, etc. when the parameter adjusting unit 121 informs the marking unit 122 of the adjusting made to the simulated sample images IM21, IM22, etc.

Then, the method proceeds to step S140 of FIG. 3, as indicated in FIG. 1, a machine learning procedure is performed by the machine learning device 130 according to the original sample image IM11, IM12, etc., the simulated sample images IM21, IM22, etc., the object range information R11, R12, R21, R22, etc., and the object type information C11, C12, C21, C22, etc. to train the object recognition model ML.

Then, the method proceeds to step S150 of FIG. 3, as indicated in FIG. 1, an image recognition procedure is performed to the input image IM3 by the processing unit 220 of the mobile device 200 according to the object recognition model ML to identify whether the input image IM3 inputted by the input unit 210 has the object O11 and the object range information R4 and the object type information C4 of the object O11 in the input image IM3. As indicated in FIG. 1, the object range information R4 is marked by the output image IM4.

Thus, even when the original sample images IM11, IM12, etc. do not show a model A computer mouse facing downwards, the deficiency of the image still may be made up, and the model A computer mouse facing downwards still may be recognized from the input image IM3. That is, even when only a small volume of original image is available, the image still may be correctly recognized through the above technologies.

It will be apparent to those skilled in the art that various modifications and variations may be made to the disclosed embodiments. It is intended that the specification and examples be considered as exemplary only, with a true scope of the disclosure being indicated by the following claims and their equivalents.

What is claimed is:

1. An image recognition method, comprising:
obtaining at least one original sample image of an object in a field and an object range information and an object type information of the object in the original sample image;
adjusting at least one physical parameter to generate a plurality of simulated sample images of the object, wherein the at least one physical parameter is an object covering ratio of the image capture device, and the step of adjusting the at least one physical parameter which is the object covering ratio to generate the simulated sample images of the object includes:
removing a background of the original sample image;
deleting some contents of the object according to the object covering ratio; and
restoring the background;
automatically marking the object range information and the object type information of the object in each of the simulated sample images;

performing a machine learning procedure according to the original sample image, the simulated sample images, the object range information and the object type information to train an object recognition model; and performing an image recognition procedure on an input image according to the object recognition model to identify whether the input image has the object and the object range information and the object type information of the object in the input image.

2. The image recognition method according to claim 1, wherein the at least one physical parameter is the image capture parameter, an object parameter, or an ambient parameter.

3. The image recognition method according to claim 2, wherein the image capture parameter is a relative position between an image capture device and the object, a relative distance between the image capture device and the object, the lens distortion of the image capture device, the contrast of the image capture device, or the volume of exposure of the image capture device.

4. The image recognition method according to claim 2, wherein the object parameter is an object rotation angle, an object displacement or an object shade.

5. The image recognition method according to claim 2, wherein the ambient parameter is a background color, a scene, an ambient brightness, or a light source position.

6. The image recognition method according to claim 1, wherein the at least one physical parameter comprises an image capture parameter and an object parameter, and an adjustment of the object parameter has priority over an adjustment of the image capture parameter.

7. The image recognition method according to claim 1, wherein the at least one physical parameter comprises an ambient parameter and an object parameter, and an adjustment of the object parameter has priority over an adjustment of the ambient parameter.

8. The image recognition method according to claim 1, wherein an amount of the at least one original sample image is greater than or equivalent to 2, and the original sample images are shot from a plurality of different shooting angles.

9. A training system for an object recognition model, comprising:
a storage device configured to store at least one original sample image of an object shot by an image capture device in a field and an object range information and an object type information of the object in the original sample image;
a sample generation device, comprising:
a parameter adjusting unit configured to adjust at least one physical parameter to generate a plurality of simulated sample images of the object, wherein the at least one physical parameter is an image capture parameter, and the image capture parameter is an object covering ratio of the image capture device, and the parameter adjusting unit removes a background of the original sample image, deletes some contents of the object according to the object covering ratio and restores the background; and
a marking unit configured to automatically mark the object range information and the object type information of the object in each of the simulated sample images; and
a machine learning device configured to perform a machine learning procedure according to the original sample image, the simulated sample images, the object range information and the object type information to train an object recognition model, wherein an image recognition procedure is performed on an input image according to the object recognition model to identify whether the input image has the object and the object range information and the object type information of the object in the input image.

10. The training system according to claim 9, wherein the at least one physical parameter is the image capture parameter, an object parameter, or an ambient parameter.

11. The training system according to claim 10, wherein the image capture parameter is a relative position between the image capture device and the object, a relative distance between the image capture device and the object, the lens distortion of the image capture device, the contrast of the image capture device, or the volume of exposure of the image capture device.

12. The training system according to claim 10, wherein the object parameter is an object rotation angle, an object displacement or an object shade.

13. The training system according to claim 10, wherein the ambient parameter is a background color, a scene, an ambient brightness, or a light source position.

14. The training system according to claim 9, wherein the at least one physical parameter comprises an image capture parameter and an object parameter, and an adjustment of the object parameter has priority over an adjustment of the image capture parameter.

15. The training system according to claim 9, wherein the at least one physical parameter comprises an ambient parameter and an object parameter, and an adjustment of the object parameter has priority over an adjustment of the ambient parameter.

* * * * *